US011361019B2

(12) United States Patent
Xiao et al.

(10) Patent No.: US 11,361,019 B2
(45) Date of Patent: Jun. 14, 2022

(54) IMAGE QUERY METHOD AND APPARATUS

(71) Applicant: Huawei Technologies Co., Ltd., Shenzhen (CN)

(72) Inventors: Lihu Xiao, Beijing (CN); Maolin Chen, Beijing (CN); Lijun Luo, Hangzhou (CN); Qiankun You, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 261 days.

(21) Appl. No.: 16/018,950

(22) Filed: Jun. 26, 2018

(65) Prior Publication Data

US 2018/0307706 A1 Oct. 25, 2018

Related U.S. Application Data

(63) Continuation of application No. PCT/CN2016/111091, filed on Dec. 20, 2016.

(30) Foreign Application Priority Data

Dec. 30, 2015 (CN) .......................... 201511023936.7

(51) Int. Cl.
*G06F 16/00* (2019.01)
*G06F 16/583* (2019.01)
(Continued)

(52) U.S. Cl.
CPC .......... *G06F 16/5838* (2019.01); *G06F 16/51* (2019.01); *G06F 16/583* (2019.01);
(Continued)

(58) Field of Classification Search
CPC ..... G06F 16/5838; G06F 16/583; G06F 16/51
See application file for complete search history.

(56) References Cited

U.S. PATENT DOCUMENTS 8,429,173 B1 * 4/2013 Rosenberg .............. G06F 16/14
707/748
2003/0195883 A1* 10/2003 Mojsilovic ......... G06K 9/00664
(Continued)

FOREIGN PATENT DOCUMENTS

CN 101136015 A 3/2008
CN 101989302 A 3/2011
(Continued)

OTHER PUBLICATIONS

Machine Translation and Abstract of Chinese Publication No. CN103207910, Jul. 17, 2013, 24 pages.
(Continued)

*Primary Examiner* — Khanh B Pham
(74) *Attorney, Agent, or Firm* — Conley Rose, P.C.

(57) ABSTRACT

An image query method and apparatus, where the method may include obtaining a global feature of a query image and an attributive feature of the query image, where the attributive feature is a feature used to describe a specific attribute area in the query image, querying an image library using the global feature to obtain a first image set that includes at least one image, where an image included in the image library includes the attributive feature, selecting at least one image whose similarity of the attributive feature to the attributive feature of the query image is greater than a preset threshold from the first image set, and setting the at least one selected image as a second image set. Hence, the method may improve image query efficiency.

20 Claims, 8 Drawing Sheets

(51) Int. Cl.
*G06F 16/51* (2019.01)
*G06V 10/40* (2022.01)
*G06V 10/75* (2022.01)
*G06V 20/52* (2022.01)

(52) U.S. Cl.
CPC ............ *G06V 10/40* (2022.01); *G06V 10/751* (2022.01); *G06V 20/52* (2022.01)

(56) References Cited

U.S. PATENT DOCUMENTS

| | | | |
|---|---|---|---|
| 2008/0118151 | A1 | 5/2008 | Bouguet et al. |
| 2008/0205795 | A1* | 8/2008 | Marques ............. G06F 16/5838 382/305 |
| 2010/0290708 | A1 | 11/2010 | Magai et al. |
| 2011/0317923 | A1 | 12/2011 | Hondo et al. |
| 2012/0233159 | A1 | 9/2012 | Datta et al. |
| 2012/0308121 | A1* | 12/2012 | Datta .................. G06F 16/5838 382/155 |
| 2013/0132377 | A1* | 5/2013 | Lin ....................... G06F 16/583 707/723 |
| 2014/0056520 | A1* | 2/2014 | Rodriguez Serrano ...................... G06K 9/325 382/174 |
| 2016/0259816 | A1* | 9/2016 | Song .................... G06K 9/6255 |
| 2017/0026665 | A1* | 1/2017 | Duan ..................... H04N 19/94 |
| 2018/0210896 | A1* | 7/2018 | Guo ........................ G06F 16/51 |

FOREIGN PATENT DOCUMENTS

| | | |
|---|---|---|
| CN | 102341824 A | 2/2012 |
| CN | 103207910 A | 7/2013 |
| CN | 103488664 A | 1/2014 |
| CN | 103810505 A | 5/2014 |
| CN | 104318216 A | 1/2015 |

OTHER PUBLICATIONS

Machine Translation and Abstract of Chinese Publication No. CN103810505, May 21, 2014, 22 pages.
Machine Translation and Abstract of Chinese Publication No. CN104318216, Jan. 28, 2015, 11 pages.
Foreign Communication From a Counterpart Application, PCT Application No. PCT/CN2016/111091, English Translation of International Search Report dated Mar. 22, 2017, 2 pages.
Foreign Communication From a Counterpart Application, PCT Application No. PCT/CN2016/111091, English Translation of Written Opinion dated Mar. 22, 2017, 5 pages.
Machine Translation and Abstract of Chinese Publication No. CN101136015, Mar. 5, 2008, 7 pages.
Machine Translation and Abstract of Chinese Publication No. CN101989302, Mar. 23, 2011, 16 pages.
Machine Translation and Abstract of Chinese Publication No. CN103488664, Jan. 1, 2014, 8 pages.
Foreign Communication From a Counterpart Application, Chinese Application No. 201511023936.7, Chinese Office Action dated Apr. 1, 2019, 7 pages.

* cited by examiner

| Attribute type | Confidence level | Feature description information | Status description information | Significance level |
|---|---|---|---|---|
| Attribute 1: Hat | W1 | Fea1 | K1 | R1 |
| Attribute 2: Handbag | W2 | Fea2 | K2 | R2 |
| ... | ... | ... | ... | ... |
| Attribute M | WM | FeaM | KM | RM |

IMAGE QUERY METHOD AND APPARATUS

CROSS-REFERENCE TO RELATED APPLICATIONS

This application is a continuation of International Patent Application No. PCT/CN2016/111091 filed on Dec. 20, 2016, which claims priority to Chinese Patent Application No. 201511023936.7 filed on Dec. 30, 2015. The disclosures of the aforementioned applications are hereby incorporated by reference in their entireties.

TECHNICAL FIELD

The present disclosure relates to the field of image technologies, and in particular, to an image query method and apparatus.

BACKGROUND

Currently, image technologies are widely applied. The image technologies include image recognition, which refers to recognizing a wanted image from an image set, for example, querying a surveillance image set of a crowded place such as a shopping mall, a school, a big plaza, or a metro station for an image of a pedestrian. However, in current image recognition, a query is performed mainly using a global feature of an image. The global feature may be an overall or global feature describing the image. When only the global feature is used to query massive images, an obtained query result may include many images, and these images may not meet a user's particular requirement. This shows that current image query efficiency is relatively low.

SUMMARY

Embodiments of the present disclosure provide an image query method and apparatus in order to improve image query efficiency.

According to a first aspect, an embodiment of the present disclosure provides an image query method, including obtaining a global feature of a query image and an attributive feature of the query image, where the attributive feature is a feature used to describe a specific attribute area in the query image, querying an image library using the global feature, to obtain a first image set that includes at least one image, where an image included in the image library includes the attributive feature, selecting at least one image whose similarity of the attributive feature to the attributive feature of the query image is greater than a preset threshold from the first image set, and setting the at least one selected image as a second image set.

In this implementation, the at least one image whose similarity of the attributive feature to the attributive feature of the query image is greater than the preset threshold can be selected from the first image set obtained by means of a query using the global feature. Fewer image samples are found in this implementation than in other approaches such that query efficiency can be improved.

In a first possible implementation of the first aspect, the attributive feature may include at least one attributive feature, and selecting at least one image whose similarity of the attributive feature to the attributive feature of the query image is greater than a preset threshold from the first image set may include selecting at least one image from the first image set, where an attribute integration similarity of the at least one attributive feature of the at least one selected image to the at least one attributive feature of the query image is greater than the preset threshold.

In this implementation, an image can be selected for the second image set according to the attribute integration similarity. In this way, images with a high similarity of some single attributes and a low similarity of some other attributes can be avoided such that precision of the second image set can be improved.

With reference to the first possible implementation of the first aspect, in a second possible implementation of the first aspect, each attributive feature may include at least one of an attribute area type, feature description information, a confidence level, status description information, or a significance level, where the attribute area type is used to indicate a type of the specific attribute area, the feature description information is used to describe a feature of the specific attribute area, the confidence level is used to indicate reliability of the specific attribute area, the status description information is used to describe a status of the specific attribute area, and the significance level is used to indicate a weight of the specific attribute area during an image query.

In this implementation, each attributive feature may include at least one of the attribute area type, the attribute description, the confidence level, the status description information, and the significance level. In this way, bases for selecting an image for the second image set are more enriched such that a more precise image can be selected for the second image set, to reduce a quantity of images in the second image set.

With reference to the second possible implementation of the first aspect, in a third possible implementation of the first aspect, the selecting at least one image from the first image set may include calculating an attribute integration similarity of the at least one attributive feature of each image in the first image set to the at least one attributive feature of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

where $Sim_j$ indicates an attribute integration similarity of the at least one attributive feature of a $j^{th}$ image in the first image set to the at least one attributive feature of the query image, n indicates an attributive feature quantity of the at least one attributive feature, $R_i$ and $W_i$ indicate a significance level and a confidence level of an $i^{th}$ attributive feature of the query image, $R_{ij}$ and $W_{ij}$ indicate a significance level and a confidence level of an $i^{th}$ attributive feature of the $j^{th}$ image in the first image set, $Q(E_i)$ indicates feature description information of the $i^{th}$ attributive feature of the query image, $Q(A_{ij})$ indicates feature description information of the $i^{th}$ attributive feature of the $j^{th}$ image in the first image set, $Dis(Q(E_i),Q(A_{ij}))$ indicates a similarity of $Q(E_i)$ to $Q(A_{ij})$, $T_i$ is a threshold with respect to an $i^{th}$ attributive feature, $R_i*W_i<T_i$ indicates that a similarity calculation result with respect to the $i^{th}$ attributive feature is 0 when a product of $R_i$ and $W_i$ is less than $T_i$, else indicates that the product of $R_i$ and $W_i$ is not less than $T_i$, and H is a quantity of images included in the first image set, and selecting the at least one image from the first image set, where the attribute integration similarity of the at least one attributive feature of the at least one selected image to the at least one attributive feature of the query image is greater than the preset threshold.

In this implementation, attribute integration similarity calculation can be performed only on an attributive feature with a product of a confidence level and a significance level being not less than the preset threshold such that a calculation amount can be reduced, to improve image query efficiency.

With reference to the first aspect, or the first possible implementation of the first aspect, or the second possible implementation of the first aspect, or the third possible implementation of the first aspect, in a fourth possible implementation of the first aspect, the method may further include extracting a global feature of each image in the image library, and constructing an index of the image library with respect to the global feature, and extracting the attributive feature of each image in the image library, and constructing an index of the image library with respect to the attributive feature.

In this implementation, image query accuracy can be improved because an image set can be effectively described and divided from different perspectives in a feature space in this implementation. Attributive features are introduced and effectively integrated during construction of an index structure such that division of the image set is more targeted.

According to a second aspect, an embodiment of the present disclosure provides an image query apparatus, including an obtaining unit, a query unit, and a selection unit, where the obtaining unit is configured to obtain a global feature of a query image and an attributive feature of the query image, where the attributive feature is a feature used to describe a specific attribute area in the query image, the query unit is configured to query an image library using the global feature, to obtain a first image set that includes at least one image, where an image included in the image library includes the attributive feature, and the selection unit is configured to select at least one image whose similarity of the attributive feature to the attributive feature of the query image is greater than a preset threshold from the first image set, and use the at least one selected image as a second image set.

In a first possible implementation of the second aspect, the attributive feature includes at least one attributive feature, and the selection unit may be configured to select at least one image from the first image set, where an attribute integration similarity of the at least one attributive feature of the at least one selected image to the at least one attributive feature of the query image is greater than the preset threshold.

With reference to the first possible implementation of the second aspect, in a second possible implementation of the second aspect, each attributive feature may include at least one of an attribute area type, feature description information, a confidence level, status description information, or a significance level, where the attribute area type is used to indicate a type of the specific attribute area, the feature description information is used to describe a feature of the specific attribute area, the confidence level is used to indicate reliability of the specific attribute area, the status description information is used to describe a status of the specific attribute area, and the significance level is used to indicate a weight of the specific attribute area during an image query.

With reference to the second possible implementation of the second aspect, in a third possible implementation of the second aspect, the selection unit may include a calculation unit configured to calculate an attribute integration similarity of the at least one attributive feature of each image in the first image set to the at least one attributive feature of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

where $Sim_j$ indicates an attribute integration similarity of the at least one attributive feature of a $j^{th}$ image in the first image set to the at least one attributive feature of the query image, n indicates an attributive feature quantity of the at least one attributive feature, $R_i$ and $W_i$ indicate a significance level and a confidence level of an $i^{th}$ attributive feature of the query image, $R_{ij}$ and $W_{ij}$ indicate a significance level and a confidence level of an $i^{th}$ attributive feature of the $j^{th}$ image in the first image set, $Q(E_i)$ indicates feature description information of the $i^{th}$ attributive feature of the query image, $Q(A_{ij})$ indicates feature description information of the $i^{th}$ attributive feature of the $j^{th}$ image in the first image set, $Dis(Q(E_i),Q(A_{ij}))$ indicates a similarity of $Q(E_i)$ to $Q(A_{ij})$, $T_i$ is a threshold with respect to an $i^{th}$ attributive feature, $R_i*W_i<T_i$ indicates that a similarity calculation result with respect to the $i^{th}$ attributive feature is 0 when a product of $R_i$ and $W_i$ is less than $T_i$, else indicates that the product of $R_i$ and $W_i$ is not less than $T_i$, and H is a quantity of images included in the first image set, and a selection subunit configured to select the at least one image from the first image set, where the attribute integration similarity of the at least one attributive feature of the at least one selected image to the at least one attributive feature of the query image is greater than the preset threshold.

With reference to the second aspect, or the first possible implementation of the second aspect, or the second possible implementation of the second aspect, or the third possible implementation of the second aspect, in a fourth possible implementation of the second aspect, the apparatus may further include a construction unit configured to extract a global feature of each image in the image library, and construct an index of the image library with respect to the global feature, where the construction unit is further configured to extract the attributive feature of each image in the image library, and construct an index of the image library with respect to the attributive feature.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

Figure 1:
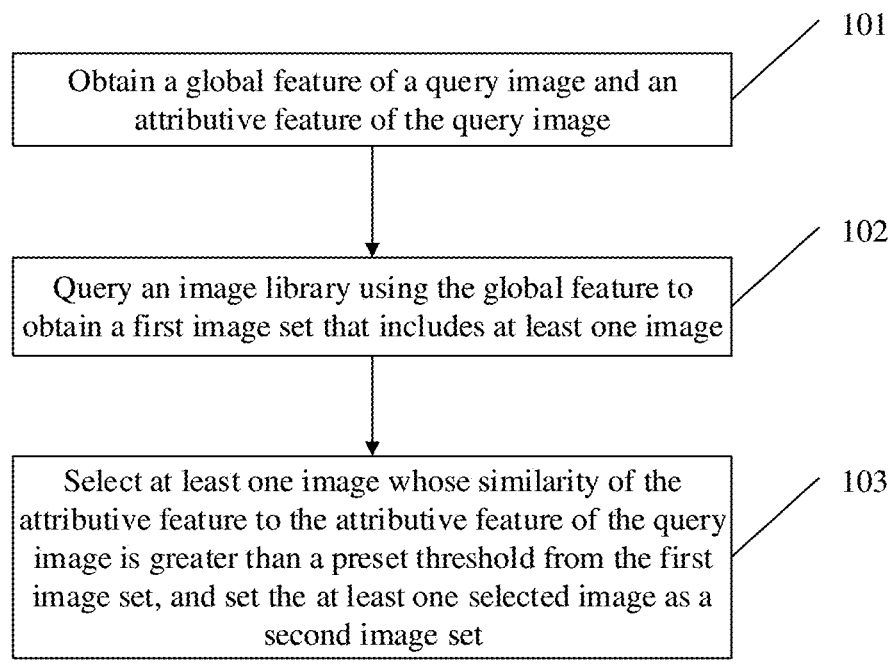
FIG. 1 is a schematic flowchart of an image query method according to an embodiment of the present disclosure.

Referring to FIG. 1, FIG. 1 is a schematic flowchart of an image query method according to an embodiment of the present disclosure. As shown in FIG. 1, the method includes the following steps.

Step 101. Obtain a global feature of a query image and an attributive feature of the query image, where the attributive feature is a feature used to describe a specific attribute area in the query image.

In this embodiment, the global feature may be an overall or global feature describing the image, and the attributive feature may be a feature of a specific attribute area of the query image. The specific attribute area may be an area that is in the query image and in which an attribute exists, for example, an area such as belongings of a pedestrian, a neckline of a pedestrian, a logo on the body of a pedestrian, a backpack of a pedestrian, a hairstyle of a pedestrian, shoes of a pedestrian, or clothes of a pedestrian in a figure image.

Step 102. Query an image library using the global feature to obtain a first image set that includes at least one image, where an image included in the image library includes the attributive feature.

In this embodiment, that the image included in the image library includes the attributive feature may be understood as follows. The image library may be searched for the attributive feature of the image. For example, if a hairstyle attributive feature of the query image is obtained in step 101, the hairstyle attributive feature may exist in all images in the image library. Certainly, in some scenarios, if some images without the hairstyle attributive feature exist in the image library, hairstyle attributive features may not be compared for the images without hairstyle attributive feature during comparison with the image in the image library.

Step 103. Select at least one image whose similarity of the attributive feature to the attributive feature of the query image is greater than a preset threshold from the first image set, and set the at least one selected image as a second image set.

In step 103, the at least one image may be selected from the first image set using the attributive feature, and used as the second image set. In this way, image samples that are found can be significantly reduced in order to improve image query efficiency.

In this embodiment, the foregoing method may be applied to any device having an image processing function, for example, a device having an image processing function such as a tablet computer, a mobile phone, an e-reader, a Personal Computer (PC), a notebook computer, an in-vehicle device, a web television, a server, or a base station.

In this embodiment, a global feature of a query image and an attributive feature of the query image are obtained, where the attributive feature is a feature used to describe a specific attribute area in the query image, the global feature is used to query an image library to obtain a first image set that includes at least one image, where an image included in the image library includes the attributive feature, and at least one image whose similarity of the attributive feature to the attributive feature of the query image is greater than a preset threshold is selected from the first image set, and the at least one selected image is used as a second image set. In this way, the at least one image whose similarity of the attributive feature to the attributive feature of the query image is greater than the preset threshold can be selected from the first image set obtained by means of a query using the global feature. Fewer image samples are found in this implementation than in the other approaches such that query efficiency can be improved.

Figures 2, 3:
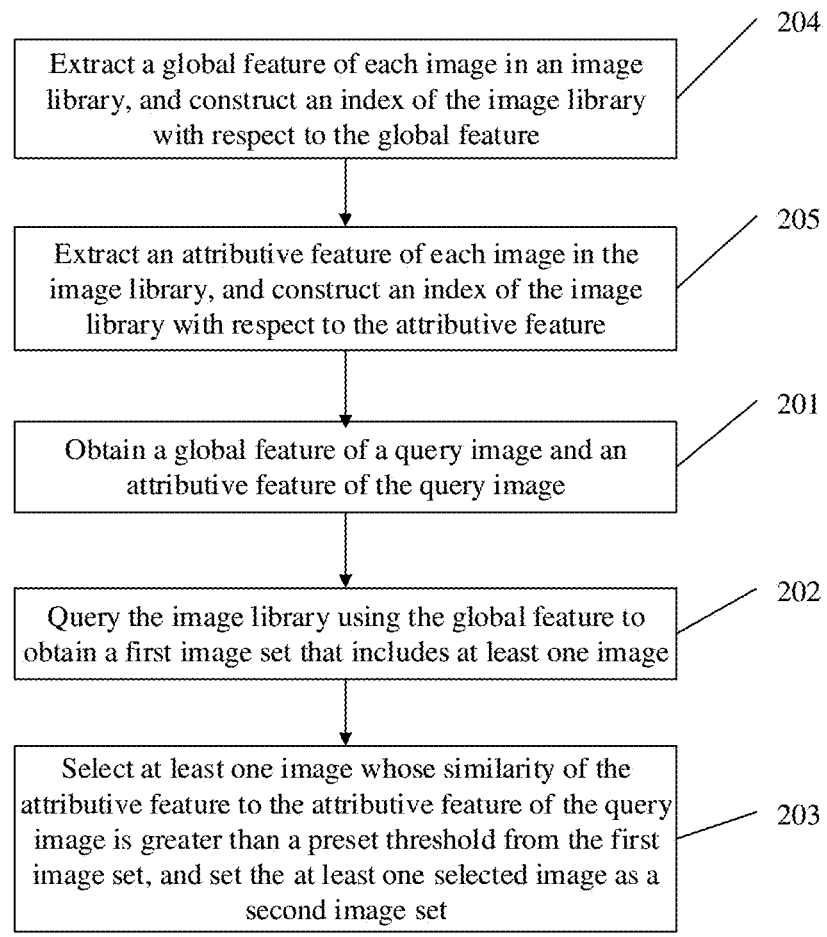
FIG. 2 is a schematic flowchart of another image query method according to an embodiment of the present disclosure.
FIG. 3 is a schematic diagram of an attributive feature according to an embodiment of the present disclosure.

Referring to FIG. 2, FIG. 2 is a schematic flowchart of another image query method according to an embodiment of the present disclosure. As shown in FIG. 2, the method includes the following steps.

Step 201. Obtain a global feature of a query image and an attributive feature of the query image, where the attributive feature is a feature used to describe a specific attribute area in the query image.

In this embodiment, step 201 may be receiving the global feature of the query image and the attributive feature of the query image that are entered by a user. In this case, the query image may not need to be recognized, and even may not need to be obtained. Alternatively, step 201 may be first obtaining the query image, then extracting the global feature from the query image, and automatically detecting the attributive feature of the query image. Certainly, in this case, the attributive feature may be entered manually by a user. In addition, it should be noted that, in this embodiment, an attribute detector that is obtained in advance may be used to detect the attributive feature. The attribute detector herein may be a virtual attribute detector, and the attribute detector may recognize an attribute area of the query image using an image recognition technology in order to obtain the attributive feature of the attribute area.

Step 202. Query an image library using the global feature to obtain a first image set that includes at least one image, where an image included in the image library includes the attributive feature.

Step 203. Select at least one image whose similarity of the attributive feature to the attributive feature of the query image is greater than a preset threshold from the first image set, and set the at least one selected image as a second image set.

In this embodiment, the attributive feature may include at least one attributive feature, and step 203 may include selecting at least one image from the first image set, where an attribute integration similarity of the at least one attributive feature of the at least one selected image to the at least one attributive feature of the query image is greater than the preset threshold.

The attribute integration similarity may be understood as a similarity obtained after integration of similarities of multiple attributes. For example, the attribute integration similarity of the at least one attributive feature of the image to the at least one attributive feature of the query image may be understood as a sum of at least one similarity of the image or an average value of at least one similarity of the image. The at least one similarity of the image is a similarity obtained by comparing the at least one attributive feature of the image with the at least one attributive feature of the query image.

In this implementation, an image can be selected for the second image set according to the attribute integration similarity. In this way, images with a high similarity of some single attributes and a low similarity of some other attributes can be avoided such that precision of the second image set can be improved.

In this implementation, each attributive feature may include at least one of an attribute area type, feature description information, a confidence level, status description information, or a significance level, where the attribute area type is used to indicate a type of the specific attribute area, the feature description information is used to describe a feature of the specific attribute area, the confidence level is used to indicate reliability of the specific attribute area, the status description information is used to describe a status of the specific attribute area, and the significance level is used to indicate a weight of the specific attribute area during an image query.

For example, the attribute area type may be belongings, a neckline, a body logo, a hairstyle, shoes, clothes, or a backpack.

The confidence level may indicate a probability of existence of the specific attribute area, and the confidence level is provided by a corresponding well-trained attribute detector. A higher confidence level indicates that the attributive feature is more distinctive. When the confidence level is lower than a specified threshold, the attribute area is considered unreliable, and may be ignored in subsequent similarity calculation.

The feature description information may further be understood as the feature describing the specific attribute area. In addition, the specific attribute area has multiple forms, and therefore the specific attribute area may be described using multiple features, such as color, texture, and shape. Belongings, for example, a handbag, may be described using color, texture, and shape in a handbag area in order to be differentiated from another image.

The status description information may further be understood as a status description of the specific attribute area, for example, a description about whether an attributive feature exists in the specific attribute area and about a corresponding type of the specific attribute area. For example, a status of the belongings attribute may be having or not having, a status of the shoes may be types, and so on. The quantity of states of each attributive feature may be manually defined, or may be adaptively determined. Alternatively, cluster learning may be performed according to the status description information of the specific attribute area in order to map each attributive feature into a corresponding low-dimensional vector.

The significance level may further indicate a relationship between attribute areas. Actually, there is a correlation between attribute areas. For example, a person wearing a skirt is usually a female, and a person with short hair is usually a male. In addition, attributes with different significance levels or different weights may affect a subsequent query result. In addition, some attributes are mutually exclusive. For example, a person wearing a skirt is usually a female, and therefore a penalty for a male attributive feature that may be detected needs to be increased. In addition, in this embodiment, a higher significance level indicates that the attributive feature can better represent a characteristic of a pedestrian, and should also have a higher weight.

In addition, the attributive feature in this embodiment may further be indicated using a table shown in FIG. 3, where W, Fea, K, and R in the table shown in FIG. 3 represent a confidence level, feature description information, status description information, and a significance level, respectively, and M indicates a quantity of attributive features.

In this implementation, each attributive feature may include at least one of the attribute area type, the attribute description, the confidence level, the status description information, and the significance level. In this way, bases for selecting an image for the second image set are more enriched such that a more precise image can be selected for the second image set, to reduce a quantity of images in the second image set. In addition, in this implementation, during calculation of an integration similarity, a similarity corresponding to an attributive feature with a low confidence level or significance level may be set to zero such that a calculation amount can be reduced. This is because a low confidence level or significance indicates that the attributive feature is unreliable or has a relatively low weight. Certainly, "low" herein may mean being lower than the preset threshold, or mean that a product of the confidence level and the significance level is lower than the preset threshold.

In the foregoing implementation, the step of selecting at least one image from the first image set may include calculating an attribute integration similarity of the at least one attributive feature of each image in the first image set to the at least one attributive feature of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

where $Sim_j$ indicates an attribute integration similarity of the at least one attributive feature of a $j^{th}$ image in the first image set to the at least one attributive feature of the query image, n indicates an attributive feature quantity of the at least one attributive feature, $R_i$ and $W_i$ indicate a significance level and a confidence level of an $i^{th}$ attributive feature of the query image, $R_{ij}$ and $W_{ij}$ indicate a significance level and a confidence level of an $i^{th}$ attributive feature of the $j^{th}$ image in the first image set, $Q(E_i)$ indicates feature description information of the $i^{th}$ attributive feature of the query image, $Q(A_{ij})$ indicates feature description information of the $i^{th}$ attributive feature of the $j^{th}$ image in the first image set, $Dis(Q(E_i),Q(A_{ij}))$ indicates a similarity of $Q(E_i)$ to $Q(A_{ij})$, $T_i$ is a threshold with respect to an $i^{th}$ attributive feature, $R_i*W_i<T_i$ indicates that a similarity calculation result with respect to the $i^{th}$ attributive feature is 0 when a product of $R_i$ and $W_i$ is less than $T_i$, else indicates that the product of $R_i$ and $W_i$ is not less than $T_i$, and H is a quantity of images included in the first image set, and selecting the at least one image from the first image set, where the attribute integration similarity of the at least one attributive feature of the at least one selected image to the at least one attributive feature of the query image is greater than the preset threshold.

In this implementation, "*" indicates a multiplication operation. In addition, $Sim_j$ may further indicate an attribute integration similarity of the $j^{th}$ image in the first image set to the query image.

In this implementation, attribute integration similarity calculation can be performed only on an attributive feature with a product of a confidence level and a significance level being not less than the preset threshold such that a calculation amount can be reduced, to improve image query efficiency.

In this embodiment, the method may further include the following steps.

Step 204. Extract a global feature of each image in the image library, and construct an index of the image library with respect to the global feature.

In this implementation, the index may be understood as a structure of sorting images in the image library in a specific manner. In this implementation, a high-dimensional feature of the image in the image library may be extracted as the global feature. In addition, dimension reduction may be performed on the high-dimensional feature using a hash function based on machine learning, and a hash value is calculated according to data obtained after the dimensional reduction. Data whose hash values collide has a similarity, and therefore the data whose hash values collide may be stored in a same hash table entry in order to construct the index of the image library with respect to the global feature.

Step 205. Extract the attributive feature of each image in the image library, and construct an index of the image library with respect to the attributive feature.

Figure 4:
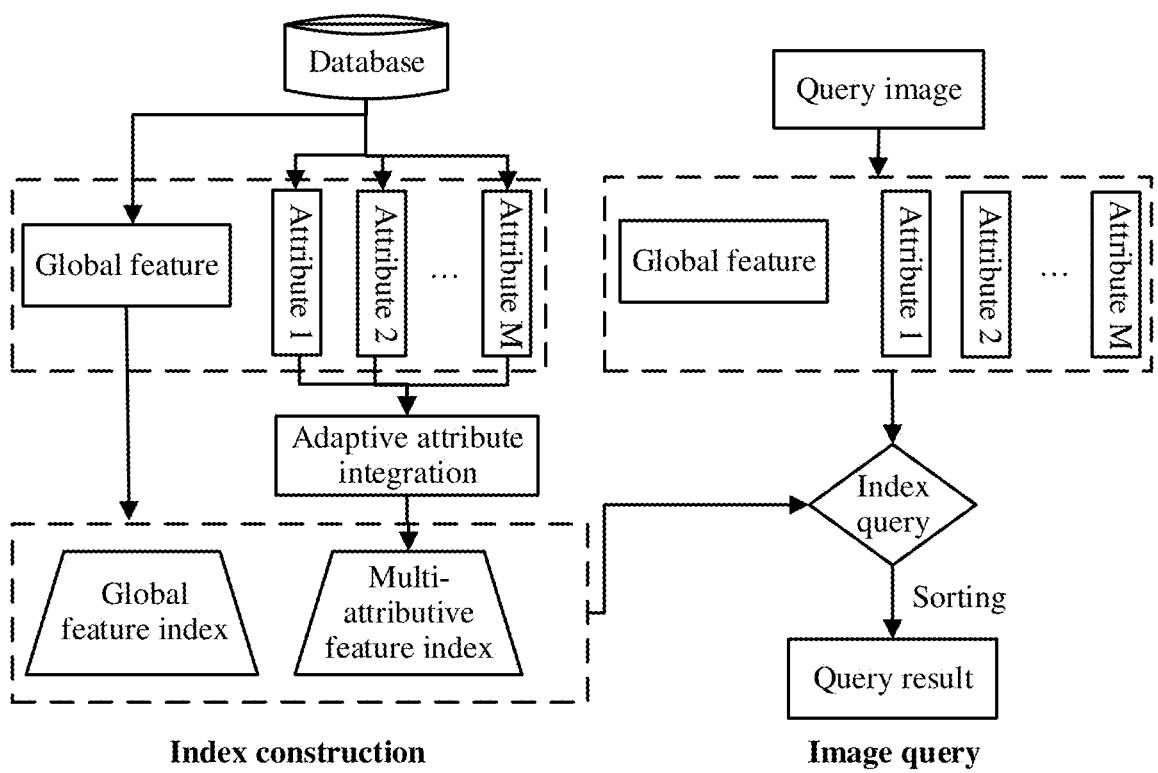
FIG. 4 is a schematic diagram of an image query according to an embodiment of the present disclosure.

In step 205, there may be one or more attributive features. In addition, when there are multiple attributive features, the multiple attributive features may be integrated in this implementation. For example, as shown in FIG. 4, the global feature and M attributive features of each image in the image library are obtained, adaptive attribute integration is performed on the M attributive features, a global feature index is constructed, and a multi-attributive feature index is constructed. The adaptive attribute integration herein may be integrating some similar attributive features in a same index table entry. In addition, the global feature and M attributive features of the query image may be obtained such that an index query may be performed to obtain a query result, that is to obtain the second image set.

In this implementation, image query accuracy can be improved because an image set can be effectively described and divided from different perspectives in a feature space in this implementation. Attributive features are introduced and effectively integrated during construction of an index structure such that division of the image set is more targeted.

In addition, in this implementation, attributive feature extraction may include extracting feature description information of a specific attribute area in an image. For example, M pieces of feature description information are extracted, where the M pieces of feature description information are indicated as $Fea_1$, $Fea_2$, . . . , and $Fea_M$. M attribute areas may be detected using M attribute detectors, and then feature description information of each attribute area may be extracted. In addition, the feature description information may be mapped into a low-dimensional expression using a mapping method obtained by means of training. For example, $Fea_1$, $Fea_2$, . . . , and $Fea_M$ are mapped into $Q(Fea_1)$, $Q(Fea_2)$, . . . , and $Q(Fea_M)$.

In addition, attributive feature extraction may further include extracting a confidence level of the specific attribute area. For example, confidence levels of the M attribute areas in the image are extracted, where the confidence levels of the M attribute areas are indicated as $W_1$, $W_2$, . . . , and $W_M$. In addition, attributive feature extraction may further include extracting a significance level of the specific attribute area. For example, significance levels of the M attribute areas in the image are extracted, where the significance levels of the M attribute areas are indicated as $R_1$, $R_2$, . . . , and $R_M$.

In the image library, a threshold T may be set for each attributive feature, and if $R_i*W_i<T_i$ i=1, . . . M, an $i^{th}$ attributive feature is set to a zero vector and is not considered in a subsequent query. For example, an $i^{th}$ piece of low-dimensional feature description information $Q(Fea_i)$ is set to a zero vector.

Figure 5:
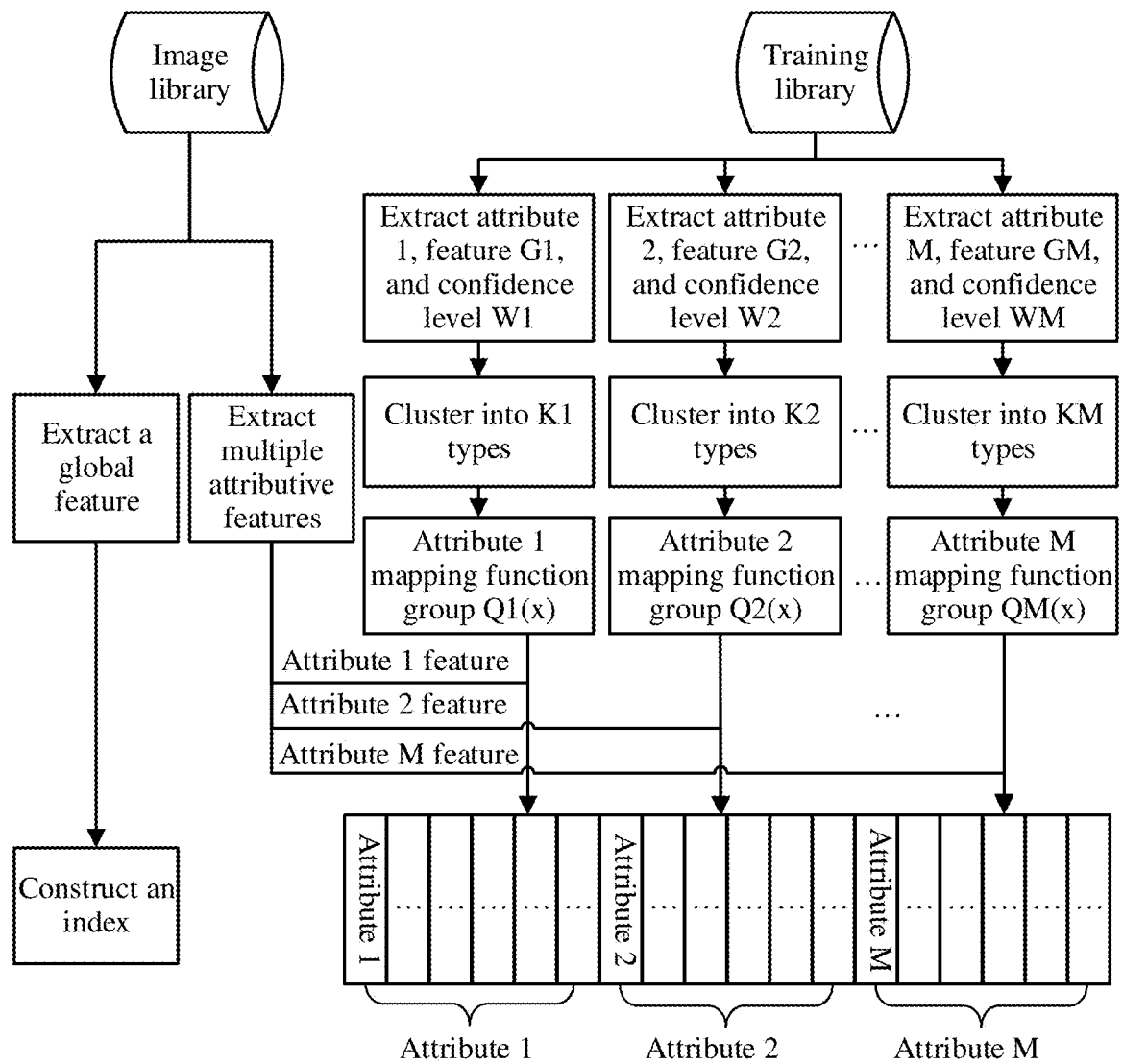
FIG. 5 is a schematic diagram of index construction according to an embodiment of the present disclosure.

In addition, the attributive feature of the image in the image library may be obtained by means of training. For example, as shown in FIG. 5, a training library for an image marked with multiple attribute areas is constructed. M attribute areas (1, . . . , and M) of the image and confidence levels (W1, . . . , and WM) of the corresponding attribute areas are detected using multiple well-trained attribute detectors, and features of the attribute areas are extracted for description in order to obtain feature description information (G1, . . . , and GM) of the attribute areas. In addition, cluster learning is performed on the feature description information of the attribute areas according to the quantity of states of each attribute area in order to cluster into K types (K1, . . . , and KM). The quantity of states of the attribute area may be preset. For example, a quantity of states of the shoes attribute area may be 2, that is, the states may include wearing shoes and wearing no shoes, or a quantity of states of the shoes attribute area may be 3, that is, the states may include wearing shoes, wearing no shoes, and a type of shoes. In addition, the feature description information of the attribute areas may be mapped into corresponding function groups (Q1(x), . . . , QM(x)) according to a result of clustering. In this way, each attributive feature may be obtained by means of the training such that an index to each attributive feature may be constructed.

Figure 6:
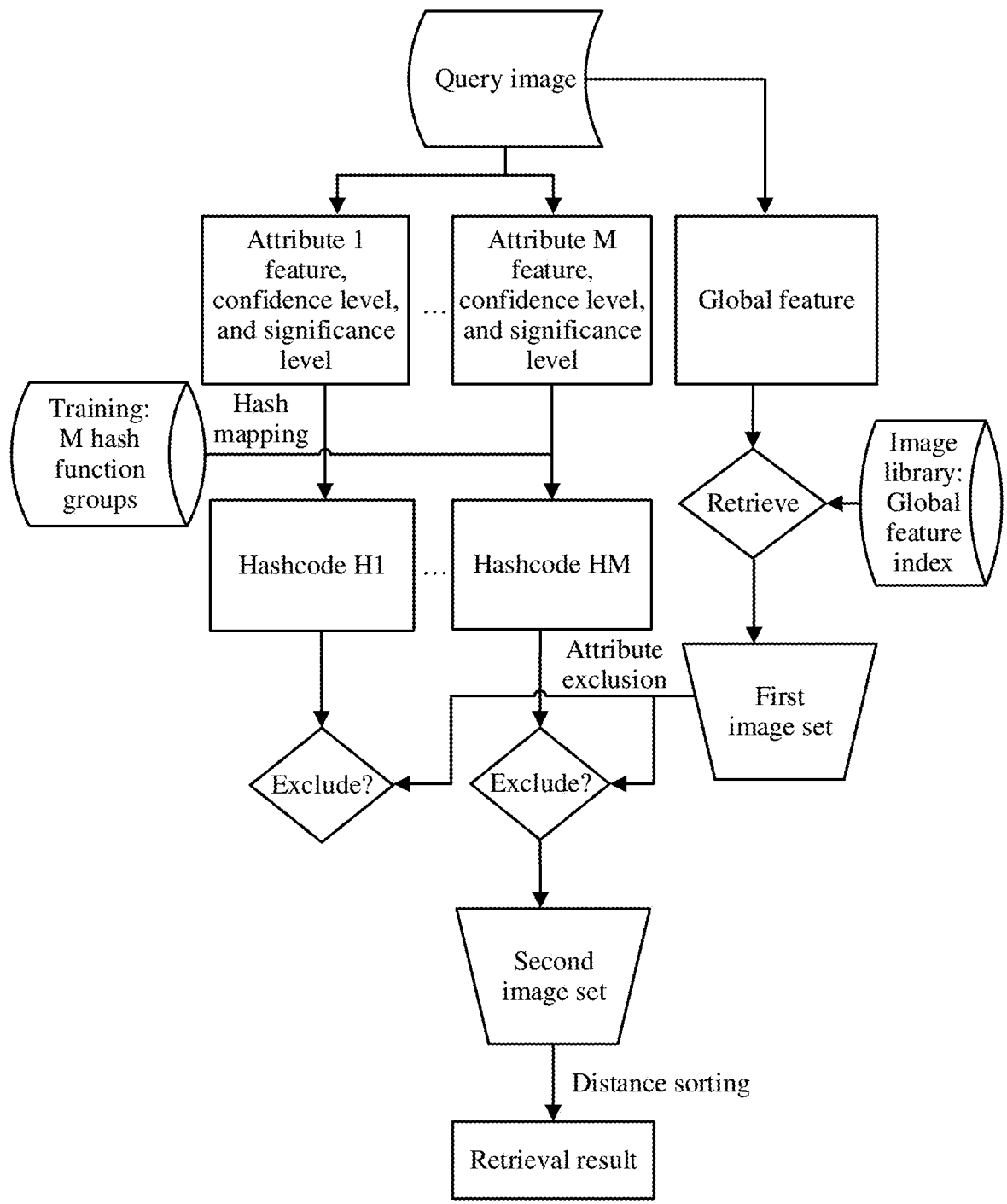
FIG. 6 is a schematic diagram of another image query according to an embodiment of the present disclosure.

In addition, in this embodiment, step 201 may be extracting the global feature of the query image and multiple attributive features $E_1$, $E_2$, L, $E_n$ that are manually selected or automatically detected. The attributive features herein may be understood as feature description information, and corresponding confidence levels $W_1$, $W_2$, L, $W_n$ and significance levels $R_1$, $R_2$, L, $R_n$ that are manually marked or automatically calculated. Manually marking means that during an image query, a user may have a greater interest in some attributes, and therefore may manually attach a higher significance level in order to obtain a query result related to the attributes in which the user is interested. For example, as shown in FIG. 6, feature description information, confidence levels, and significance levels of M attribute areas of the query image, and the global feature of the query image are obtained.

Step 202 is searching using the global feature, to obtain the first image set. For example, as shown in FIG. 6, global feature indexing is performed on the image library, to obtain the first image set.

In addition, the mapping method described above may be introduced to obtain feature code $Q(E_1)$, $Q(E_2)$, . . . , and $Q(E_M)$ of the feature description information of the attribute areas of the query image. The mapping method may be performing mapping dimension reduction using a hash function group. For example, as shown in FIG. 6, the M attributive features of the query image are mapped into M hash codes (H1, . . . , and HM).

The second image set is selected using the attribute integration similarity calculation formula described above. For example, as shown in FIG. 6, attribute exclusion is performed on images in the first image set, to obtain the second image set. In addition, the method may further be used to sort images in the second image set. For example, FIG. 6 shows distance sorting, that is, distance sorting is performed according to an integration similarity to display an image with a higher integration similarity.

It should be noted that, in this embodiment, the image library may be an image library that is locally obtained in advance. For example, the image library is constructed using step 204 and step 205. In addition, in this embodiment, the image library may be stored in an external device. For example, in step 202, a query may be sent to the external device in order to receive the first image set that is sent by the external device, where the query request includes the global feature of the query image.

In this embodiment, multiple optional implementations are added on the basis of the embodiment shown in FIG. 1, and all can improve image query efficiency.

Figure 7:
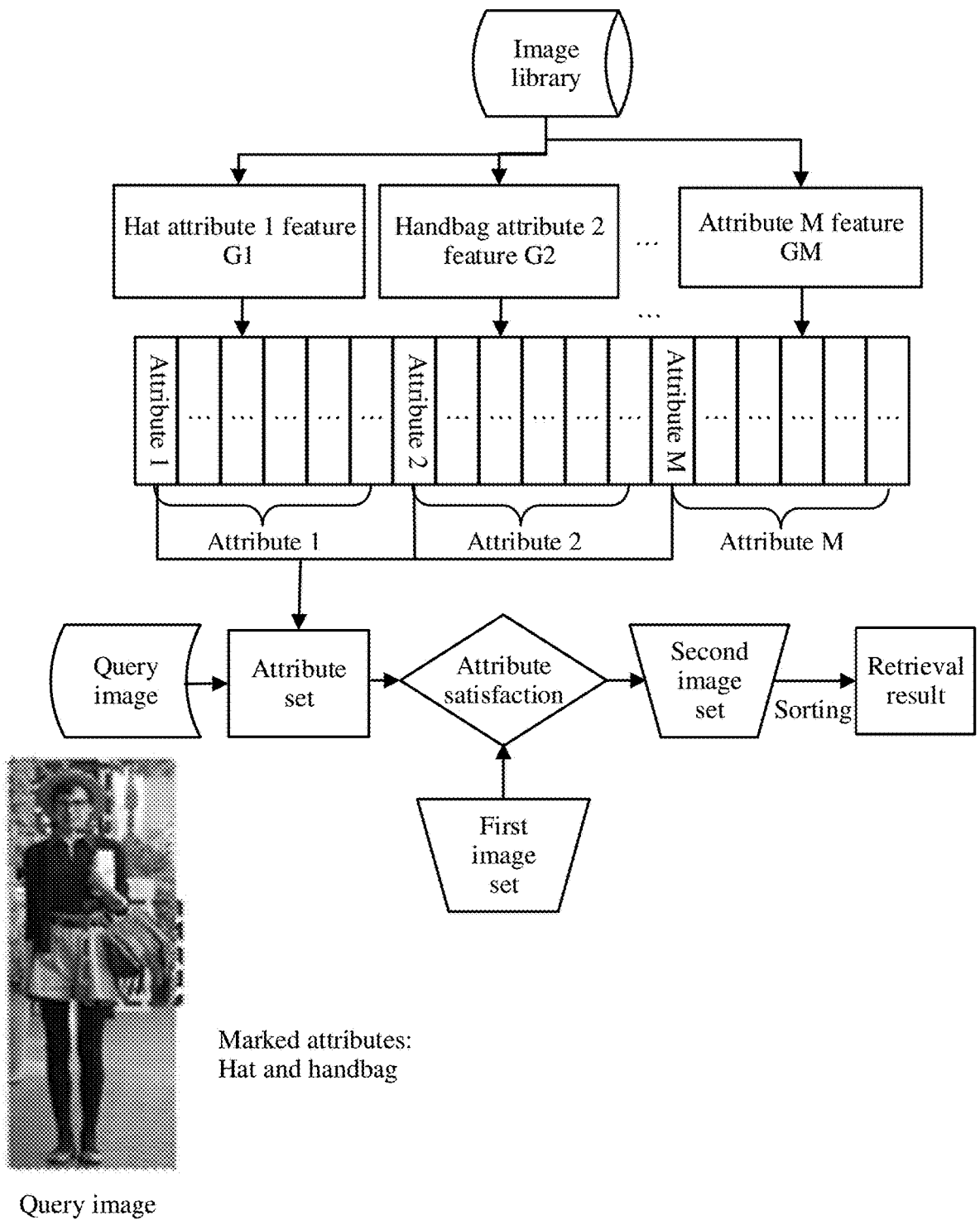
FIG. 7 is a schematic diagram of another image query according to an embodiment of the present disclosure.

Referring to FIG. 7, the following uses two attribute areas, hat and handbag as examples for description. As shown in FIG. 7, marked attributes of a query image include a hat and handbag, that is, an image query is performed using the two attribute areas hat and handbag. As shown in FIG. 7, each image in an image library includes feature description information, a confidence level, and a significance level of the hat, feature description information, a confidence level, and a significance level of the handbag, and feature description information, a confidence level, and a significance level of another attribute area. Index table entries attribute 1, attribute 2, . . . , and attribute M shown in FIG. 7 may be obtained by constructing an attributive feature index according to the embodiment shown in FIG. 2. After the query image is obtained, attributive features of the hat and the handbag of the query image and attributive features of the hat and the handbag of each image in the image library, that is, an attribute set shown in FIG. 7, may be obtained. In this way, attribute satisfaction determining may be performed on a first image set. For example, the attribute similarity integration method described in the embodiment shown in FIG. 2 is used for the attribute satisfaction determining, to obtain a second image set, and then sorting is performed on the second image set, to obtain a query result.

The following is an apparatus embodiment of the present disclosure, and the apparatus embodiment of the present disclosure is used to execute the method implemented in the first and the second method embodiments of the present disclosure. For ease of description, only parts related to this embodiment of the present disclosure are shown. For specific technical details that are not disclosed, refer to the first embodiment and the second embodiment of the present disclosure.

Figure 8:
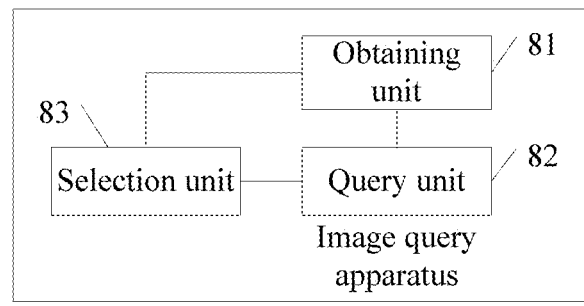
FIG. 8 is a schematic structural diagram of an image query apparatus according to an embodiment of the present disclosure.

Referring to FIG. 8, FIG. 8 is a schematic structural diagram of an image query apparatus according to an embodiment of the present disclosure. As shown in FIG. 8, the apparatus includes an obtaining unit 81, a query unit 82, and a selection unit 83.

The obtaining unit 81 is configured to obtain a global feature of a query image and an attributive feature of the query image, where the attributive feature is a feature used to describe a specific attribute area in the query image.

The query unit 82 is configured to query an image library using the global feature, to obtain a first image set that includes at least one image, where an image included in the image library includes the attributive feature.

The selection unit 83 is configured to select at least one image whose similarity of the attributive feature to the attributive feature of the query image is greater than a preset threshold from the first image set, and set the at least one selected image as a second image set.

In this embodiment, the attributive feature may include at least one attributive feature, and the selection unit 83 may be configured to select at least one image from the first image set, where an attribute integration similarity of the at least one attributive feature of the at least one selected image to the at least one attributive feature of the query image is greater than the preset threshold.

In this embodiment, each attributive feature may include at least one of an attribute area type, feature description information, a confidence level, status description information, or a significance level, where the attribute area type is used to indicate a type of the specific attribute area, the feature description information is used to describe a feature of the specific attribute area, the confidence level is used to indicate reliability of the specific attribute area, the status description information is used to describe a status of the specific attribute area, and the significance level is used to indicate a weight of the specific attribute area during an image query.

Figure 9:
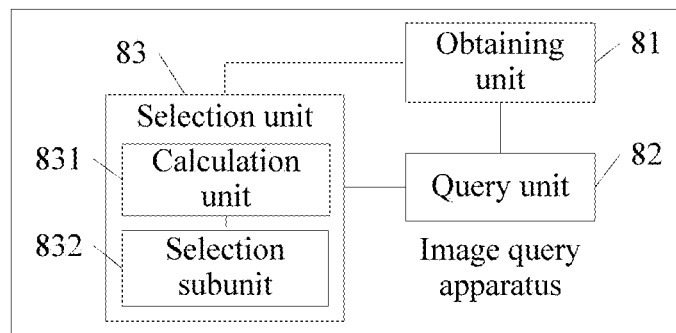
FIG. 9 is a schematic structural diagram of an image query apparatus according to an embodiment of the present disclosure.

In this embodiment, as shown in FIG. 9, the selection unit 83 may include a calculation unit 831 configured to calculate an attribute integration similarity of the at least one attributive feature of each image in the first image set to the at least one attributive feature of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

where $Sim_j$ indicates an attribute integration similarity of the at least one attributive feature of a $j^{th}$ image in the first image set to the at least one attributive feature of the query image, n indicates an attributive feature quantity of the at least one attributive feature, $R_i$ and $W_i$ indicate a significance level and a confidence level of an $i^{th}$ attributive feature of the query image, $R_{ij}$ and $W_{ij}$ indicate a significance level and a confidence level of an $i^{th}$ attributive feature of the $j^{th}$ image in the first image set, $Q(E_i)$ indicates feature description information of the $i^{th}$ attributive feature of the query image, $Q(A_{ij})$ indicates feature description information of the $i^{th}$ attributive feature of the $j^{th}$ image in the first image set, $Dis(Q(E_i),Q(A_{ij}))$ indicates a similarity of $Q(E_i)$ to $Q(A_{ij})$, $T_i$ is a threshold with respect to an $i^{th}$ attributive feature, $R_i*W_i<T_i$ indicates that a similarity calculation result with respect to the $i^{th}$ attributive feature is 0 when a product of $R_i$ and $W_i$ is less than $T_i$, else indicates that the product of $R_i$ and $W_i$ is not less than $T_i$, and H is a quantity of images included in the first image set, and a selection subunit 832 configured to select the at least one image from the first image set, where the attribute integration similarity of the at least one attributive feature of the at least one selected image to the at least one attributive feature of the query image is greater than the preset threshold.

Figure 10:
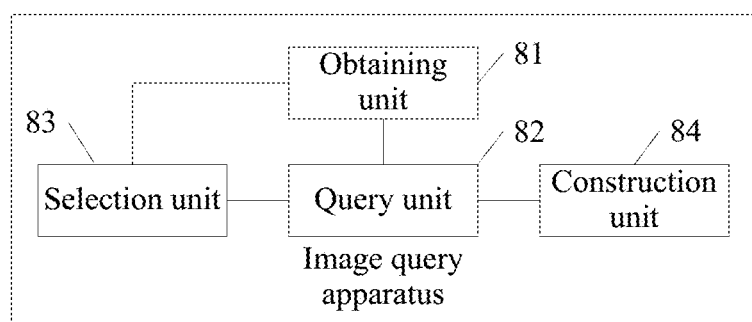
FIG. 10 is a schematic structural diagram of an image query apparatus according to an embodiment of the present disclosure.

In this embodiment, as shown in FIG. 10, the apparatus may further include a construction unit 84 configured to extract a global feature of each image in the image library, and construct an index of the image library with respect to the global feature, where the construction unit 84 is further configured to extract the attributive feature of each image in the image library, and construct an index of the image library with respect to the attributive feature.

It should be noted that, the apparatus provided in this embodiment may be an apparatus configured to implement the methods provided in the embodiments shown in FIG. 1 and FIG. 2, and any implementation in the embodiments shown in FIG. 1 and FIG. 2 can be implemented by this apparatus.

In this embodiment, the apparatus may be applied to any device having an image processing function, for example, a device having an image processing function such as a tablet computer, a mobile phone, an e-reader, a PC, a notebook computer, an in-vehicle device, a web television, a server, or a base station.

In this embodiment, a global feature of a query image and an attributive feature of the query image are obtained, where the attributive feature is a feature used to describe a specific attribute area in the query image, the global feature is used to query an image library to obtain a first image set that includes at least one image, where an image included in the image library includes the attributive feature, and at least one image whose similarity of the attributive feature to the attributive feature of the query image is greater than a preset threshold is selected from the first image set, and the at least one selected image is used as a second image set. In this way, the at least one image whose similarity of the attributive feature to the attributive feature of the query image is greater than the preset threshold can be selected from the first image set obtained by means of a query using the global feature. Fewer image samples are found in this implementation than in the other approaches such that query efficiency can be improved.

Figure 11:
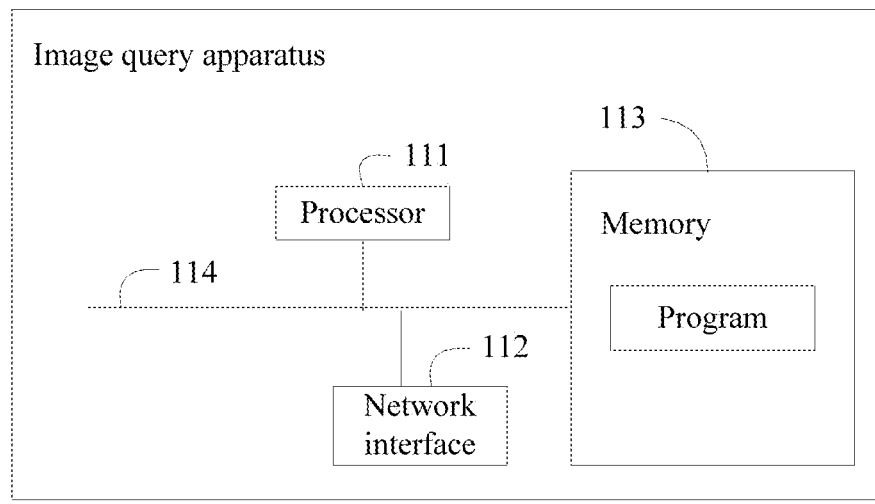
FIG. 11 is a schematic structural diagram of another image query apparatus according to an embodiment of the present disclosure.

Referring to FIG. 11, FIG. 11 is a schematic structural diagram of another image query apparatus according to an embodiment of the present disclosure. As shown in FIG. 11, the apparatus includes a processor 111, a network interface 112, a memory 113, and a communications bus 114, where the communications bus 114 is configured to implement connection and communication between the processor 111, network interface 112 and memory 113. The processor 111 executes a program stored in the memory 113 to implement the following method of obtaining a global feature of a query image and an attributive feature of the query image, where the attributive feature is a feature used to describe a specific attribute area in the query image, querying an image library using the global feature, to obtain a first image set that includes at least one image, where an image included in the image library includes the attributive feature, selecting at least one image whose similarity of the attributive feature to the attributive feature of the query image is greater than a preset threshold from the first image set, and setting the at least one selected image as a second image set.

In this embodiment, the attributive feature may include at least one attributive feature, and the program, executed by the processor 111, of selecting at least one image whose similarity of the attributive feature to the attributive feature of the query image is greater than a preset threshold from the first image set may include selecting at least one image from the first image set, where an attribute integration similarity of the at least one attributive feature of the at least one selected image to the at least one attributive feature of the query image is greater than the preset threshold.

In this embodiment, each attributive feature may include at least one of the following an attribute area type, feature description information, a confidence level, status description information, or a significance level, where the attribute area type is used to indicate a type of the specific attribute area, the feature description information is used to describe a feature of the specific attribute area, the confidence level is used to indicate reliability of the specific attribute area, the status description information is used to describe a status of the specific attribute area, and the significance level is used to indicate a weight of the specific attribute area during an image query.

In this embodiment, the program, executed by the processor 111, of selecting at least one image from the first image set may include calculating an attribute integration similarity of the at least one attributive feature of each image in the first image set to the at least one attributive feature of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

where $Sim_j$ indicates an attribute integration similarity of the at least one attributive feature of a $j^{th}$ image in the first image set to the at least one attributive feature of the query image, n indicates an attributive feature quantity of the at least one attributive feature, $R_i$ and $W_i$ indicate a significance level and a confidence level of an $i^{th}$ attributive feature of the query image, $R_{ij}$ and $W_{ij}$ indicate a significance level and a confidence level of an $i^{th}$ attributive feature of the $j^{th}$ image in the first image set, $Q(E_i)$ indicates feature description information of the $i^{th}$ attributive feature of the query image, $Q(A_{ij})$ indicates feature description information of the $i^{th}$ attributive feature of the $j^{th}$ image in the first image set, $Dis(Q(E_i),Q(A_{ij}))$ indicates a similarity of $Q(E_i)$ to $Q(A_{ij})$, $T_i$ is a threshold with respect to an $i^{th}$ attributive feature, $R_i*W_i<T_i$ indicates that a similarity calculation result with respect to the $i^{th}$ attributive feature is 0 when a product of $R_i$ and $W_i$ is less than $T_i$, else indicates that the product of $R_i$ and $W_i$ is not less than $T_i$, and H is a quantity of images included in the first image set, and selecting the at least one image from the first image set, where the attribute integration similarity of the at least one attributive feature of the at least one selected image to the at least one attributive feature of the query image is greater than the preset threshold.

In this embodiment, the program executed by the processor 111 may further include extracting a global feature of each image in the image library, constructing an index of the image library with respect to the global feature, extracting the attributive feature of each image in the image library, and constructing an index of the image library with respect to the attributive feature.

It should be noted that, the apparatus provided in this embodiment may be an apparatus configured to implement the methods provided in the embodiments shown in FIG. 1 and FIG. 2, and any implementation in the embodiments shown in FIG. 1 and FIG. 2 can be implemented by this apparatus.

In this embodiment, the apparatus may be applied to any device having an image processing function, for example, a device having an image processing function such as a tablet computer, a mobile phone, an e-reader, a PC, a notebook computer, an in-vehicle device, a web television, a server, or a base station.

In this embodiment, a global feature of a query image and an attributive feature of the query image are obtained, where the attributive feature is a feature used to describe a specific attribute area in the query image, the global feature is used to query an image library to obtain a first image set that includes at least one image, where an image included in the image library includes the attributive feature, and at least one image whose similarity of the attributive feature to the attributive feature of the query image is greater than a preset threshold is selected from the first image set, and the at least one selected image is used as a second image set. In this way, the at least one image whose similarity of the attributive feature to the attributive feature of the query image is greater than the preset threshold can be selected from the first image set obtained by means of a query using the global feature. Fewer image samples are found in this implementation than in the other approaches such that query efficiency can be improved.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The storage medium may include a magnetic disc, an optical disc, a read-only memory (ROM), or a random access memory (RAM).

What is disclosed above is merely example embodiments of the present disclosure, and certainly is not intended to limit the protection scope of the present disclosure. Therefore, equivalent variations made in accordance with the claims of the present disclosure shall fall within the scope of the present disclosure.

What is claimed is:

1. An image query method, comprising:
   obtaining a global feature of a query image and a plurality of first attributive features of the query image, wherein a first attributive feature comprises a feature describing a specific attribute area in the query image;
   querying an image library based on the global feature to obtain a first image set, wherein the first image set comprises at least one image, and each image in the first image set has a plurality of second attributive features that correspond to the plurality of first attributive features;
   selecting at least one image from the first image set whose similarity of a respective plurality of second attributive features to the plurality of first attributive features of the query image is greater than a preset threshold, wherein the similarity corresponds to an attribute integration similarity of the respective plurality of second attributive features to the plurality of first attributive features, wherein the attribute integration similarity is a sum of attributive feature similarities determined by comparing a first attributive feature with a corresponding second attributive feature using a significance level or a confidence level, wherein the significance level indicates a weight of a respective specific attribute area associated with a respective attributive feature, wherein the confidence level indicates reliability of the respective specific attribute area, wherein the attribute integration similarity is a function of significance levels or confidence levels of the first attributive features of the query image, further significance levels or confidence levels of the second attributive features of images in the first image set, and distances between feature description information of the first attributive features and the second attributive features, and wherein the significance levels or confidence levels of the first attributive features are a different set than the significance levels or confidence levels of the second attributive features;
   setting the at least one selected image as a second image set; and
   obtaining a query result based on the second image set.

2. The method of claim 1, wherein the similarity corresponds to the attribute integration similarity of the respective plurality of second attributive features to the plurality of first attributive features being greater than the preset threshold.

3. The method of claim 2, wherein comparing the first attributive feature with the corresponding second attributive feature is further based on an attribute area type that indicates a type of the respective specific attribute area.

4. The method of claim 2, wherein comparing the first attributive feature with the corresponding second attributive feature is further based on status description information describing a status of the respective specific attribute area.

5. The method of claim 2, wherein the significance level further indicates a relative significance of a respective first attributive feature in representing the global feature with respect to other first attributive features, or a relative significance of a respective second attributive feature in representing the global feature with respect to other second attributive features.

6. The method of claim 2, wherein selecting the at least one image from the first image set comprises:
   calculating the attribute integration similarity of the respective plurality of second attributive features of each image in the first image set to the plurality of first attributive features of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

the $Sim_j$ indicating an attribute integration similarity of the plurality of second attributive features of a $j^{th}$ image in the first image set to the plurality of first attributive features of the query image, the n indicating an attributive feature quantity of the plurality of first attributive features, the $R_i$ and the $W_i$ indicating a significance level and a confidence level of an $i^{th}$ first attributive feature of the query image, the $R_{ij}$ and the $W_{ij}$ indicating a significance level and a confidence level of an $i^{th}$ second attributive feature of the $j^{th}$ image in the first image set, the $Q(E_i)$ indicating feature description information of the $i^{th}$ first attributive feature of the query image, the $Q(A_{ij})$ indicating feature description information of the $i^{th}$ second attributive feature of the $j^{th}$ image in the first image set, the $Dis(Q(E_i),Q(A_{ij}))$ indicating a similarity of the $Q(E_i)$ to the $Q(A_{ij})$, the $T_i$ comprising a threshold with respect to an $i^{th}$ first attributive feature, the $R_i*W_i<T_i$ indicating that a similarity calculation result with respect to the $i^{th}$ first attributive feature comprises zero when a product of the $R_i$ and the $W_i$ is less than the $T_i$, else indicating that the product of the $R_i$ and the $W_i$ is not less than the $T_i$, and the H comprising a quantity of images comprised in the first image set; and selecting the at least one image from the first image set, the attribute integration similarity of the plurality of second attributive features of the at least one selected image to the plurality of first attributive features of the query image being greater than the preset threshold.

7. The method of claim 1, further comprising:
extracting a global feature of each image in the image library;
constructing an index of the image library with respect to the global feature of each image;
extracting the plurality of second attributive features of each image in the image library; and
constructing the index of the image library with respect to the plurality of second attributive features.

8. The method of claim 1, wherein each first attributive feature and each second attributive feature comprises at least one of a color, texture, or shape.

9. An image query apparatus, comprising:
a memory comprising instructions; and
a processor coupled to the memory, the instructions causing the processor to be configured to:
    obtain a global feature of a query image and a plurality of first attributive features of the query image, wherein a first attributive feature comprises a feature describing a specific attribute area in the query image;
    query an image library based on the global feature to obtain a first image set, wherein the first image set comprises at least one image, and each image in the first image set has a plurality of second attributive features that correspond to the plurality of first attributive features;
    select at least one image from the first image set whose similarity of a respective plurality of second attributive features to the plurality of first attributive features of the query image is greater than a preset threshold, wherein the similarity corresponds to an attribute integration similarity of the respective plurality of second attributive features to the plurality of first attributive features, wherein the attribute integration similarity is a sum of attributive feature similarities determined by comparing a first attributive feature with a corresponding second attributive feature using a significance level or a confidence level, wherein the significance level indicates a weight of a respective specific attribute area associated with a respective attributive feature, wherein the confidence level indicates reliability of the respective specific attribute area, wherein the attribute integration similarity is a function of significance levels or confidence levels of the first attributive features of the query image, further significance levels or confidence levels of the second attributive features of images in the first image set, and distances between feature description information of the first attributive features and the second attributive features, and wherein the significance levels or confidence levels of the first attributive features are a different set than the significance levels or confidence levels of the second attributive features;
    set the at least one selected image as a second image set; and
    obtain a query result based on the second image set.

10. The apparatus of claim 9, wherein the similarity corresponds to the attribute integration similarity of the respective plurality of second attributive features to the plurality of first attributive features being greater than the preset threshold.

11. The apparatus of claim 10, wherein comparing the first attributive feature with the corresponding second attributive feature is further based on an attribute area type that indicates a type of the respective specific attribute area.

12. The apparatus of claim 10, wherein comparing the first attributive feature with the corresponding second attributive feature is further based on status description information describing a status of the respective specific attribute area.

13. The apparatus of claim 10, wherein the significance level further indicates a relative significance of a respective first attributive feature in representing the global feature with respect to other first attributive features, or a relative significance of a respective second attributive feature in representing the global feature with respect to other second attributive features.

14. The apparatus of claim 10, wherein the instructions further cause the processor to be configured to:
    calculate the attribute integration similarity of the respective plurality of second attributive features of each image in the first image set to the plurality of first attributive features of the query image using the following formula:

$$Sim_j = \sum_{i=1}^{n} \begin{cases} 0, & R_i * W_i < T_i \\ R_i * R_{ij} * W_i * W_{ij} * Dis(Q(E_i), Q(A_{ij})) & \text{else} \end{cases},$$

$$j = 1, L, H,$$

the $Sim_j$ indicating an attribute integration similarity of the plurality of second attributive features of a $j^{th}$ image in the first image set to the plurality of first attributive features of the query image, the n indicating an attributive feature quantity of the plurality of first attributive features, the $R_i$ and the $W_i$ indicating a significance level and a confidence level of an $i^{th}$ first attributive feature of the query image, the $R_{ij}$ and the $W_{ij}$ indicating a significance level and a confidence level of an $i^{th}$ second attributive feature of the $j^{th}$ image in the first image set, the $Q(E_i)$ indicating feature description information of the $i^{th}$ first attributive feature of the query image, the $Q(A_{ij})$ indicating feature description information of the $i^{th}$ second attributive feature of the $j^{th}$ image in the first image set, the $Dis(Q(E_i),Q(A_{ij}))$ indicating a similarity of the $Q(E_i)$ to the $Q(A_{ij})$, the $T_i$ comprising a threshold with respect to an $i^{th}$ first attributive feature, the $R_i*W_i<T_i$ indicating that a similarity calculation result with respect to the $i^{th}$ first attributive feature comprises zero when a product of the $R_i$ and the $W_i$ is less than the $T_i$, else indicating that the product of the $R_i$ and the $W_i$ is not less than the $T_i$, and the H comprising a quantity of images comprised in the first image set; and
    select the at least one image from the first image set, the attribute integration similarity of the plurality of second attributive features of the at least one selected image to the plurality of first attributive features of the query image being greater than the preset threshold.

15. The apparatus of claim 9, wherein the instructions further cause the processor to be configured to:
    extract a global feature of each image in the image library;
    construct an index of the image library with respect to the global feature of each image;

extract the plurality of second attributive features of each image in the image library; and construct the index of the image library with respect to the plurality of second attributive features.

16. The apparatus of claim 9, wherein each first attributive feature and each second attributive feature comprises at least one of a color, texture, or shape.

17. A computer program product comprising computer-executable instructions for storage on a non-transitory computer-readable medium that, when executed by a processor, cause an apparatus to:

obtain a global feature of a query image and a plurality of first attributive features of the query image, wherein a first attributive feature comprises a feature describing a specific attribute area in the query image;

query an image library based on the global feature to obtain a first image set, wherein the first image set comprises at least one image, and each image in the first image set has a plurality of second attributive features that correspond to the plurality of first attributive features;

select at least one image from the first image set whose similarity of a respective plurality of second attributive features to the plurality of first attributive features of the query image is greater than a preset threshold, wherein the similarity corresponds to an attribute integration similarity of the respective plurality of second attributive features to the plurality of first attributive features, wherein the attribute integration similarity is a sum of attributive feature similarities determined by comparing a first attributive feature with a corresponding second attributive feature using a significance level or a confidence level, wherein the significance level indicates a weight of a respective specific attribute area associated with a respective attributive feature, wherein the confidence level indicates reliability of the respective specific attribute area, wherein the attribute integration similarity is a function of significance levels or confidence levels of the first attributive features of the query image, further significance levels or confidence levels of the second attributive features of images in the first image set, and distances between feature description information of the first attributive features and the second attributive features, and wherein the significance levels or confidence levels of the first attributive features are a different set than the significance levels or confidence levels of the second attributive features;

set the at least one selected image as a second image set; and obtain a query result based on the second image set.

18. The computer program product of claim 17, wherein comparing the first attributive feature with the corresponding second attributive feature is further based on at least one of an attribute area type that indicates a type of the specific attribute area, or status description information describing a status of the specific attribute area.

19. The computer program product of claim 17, wherein the significance level further indicates a relative significance of a respective first attributive feature in representing the global feature with respect to other first attributive features, or a relative significance of a respective second attributive feature in representing the global feature with respect to other second attributive features.

20. The computer program product of claim 17, wherein each first attributive feature and each second attributive feature comprises at least one of a color, texture, or shape.

* * * * *

UNITED STATES PATENT AND TRADEMARK OFFICE
CERTIFICATE OF CORRECTION

PATENT NO.         : 11,361,019 B2
APPLICATION NO.    : 16/018950
DATED              : June 14, 2022
INVENTOR(S)        : Xiao et al.

It is certified that error appears in the above-identified patent and that said Letters Patent is hereby corrected as shown below:

In the Claims

Claim 6, Column 16, Line 45: "j=1,L,H," should read "j=1,...,H,"

Claim 14, Column 18, Line 33: "j=1,L,H," should read "j=1,...,H,"

Signed and Sealed this
Twenty-sixth Day of July, 2022

Katherine Kelly Vidal
*Director of the United States Patent and Trademark Office*